Figure 5:
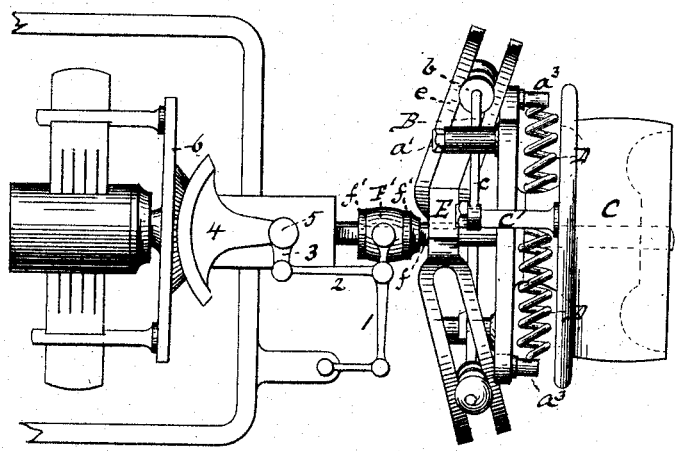

(No Model.) 3 Sheets—Sheet 1.
A. W. MESTON.
GOVERNOR FOR ELECTRIC MOTORS.
No. 353,367. Patented Nov. 30, 1886.
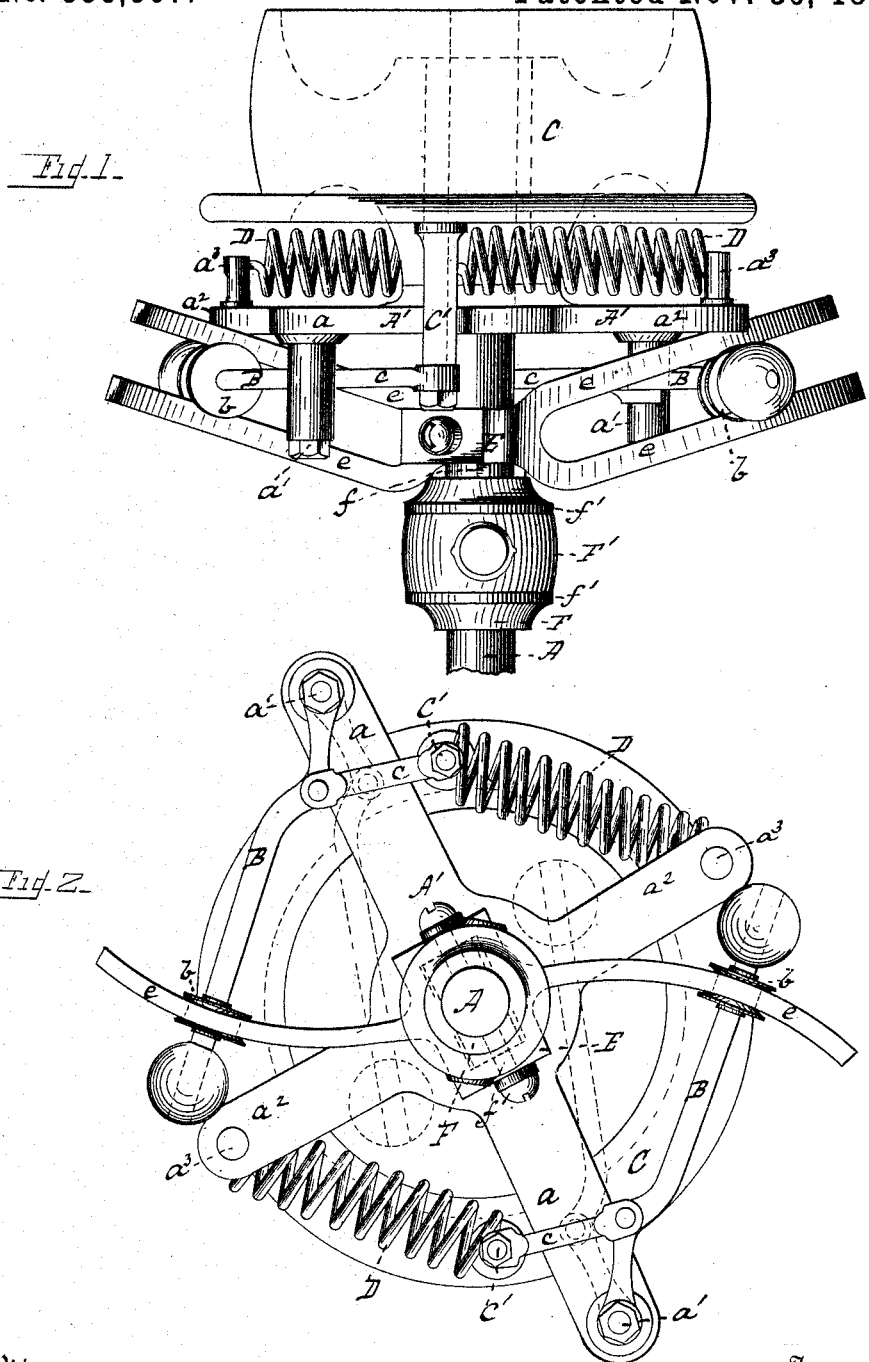
Witnesses
J. A. Rauberschmidt
Edwin S. Clarkson
Inventor
Alexander W. Meston
By his Attorney F. W. Ritter Jr.

(No Model.) 3 Sheets—Sheet 2.
A. W. MESTON.
GOVERNOR FOR ELECTRIC MOTORS.
No. 353,367. Patented Nov. 30, 1886.
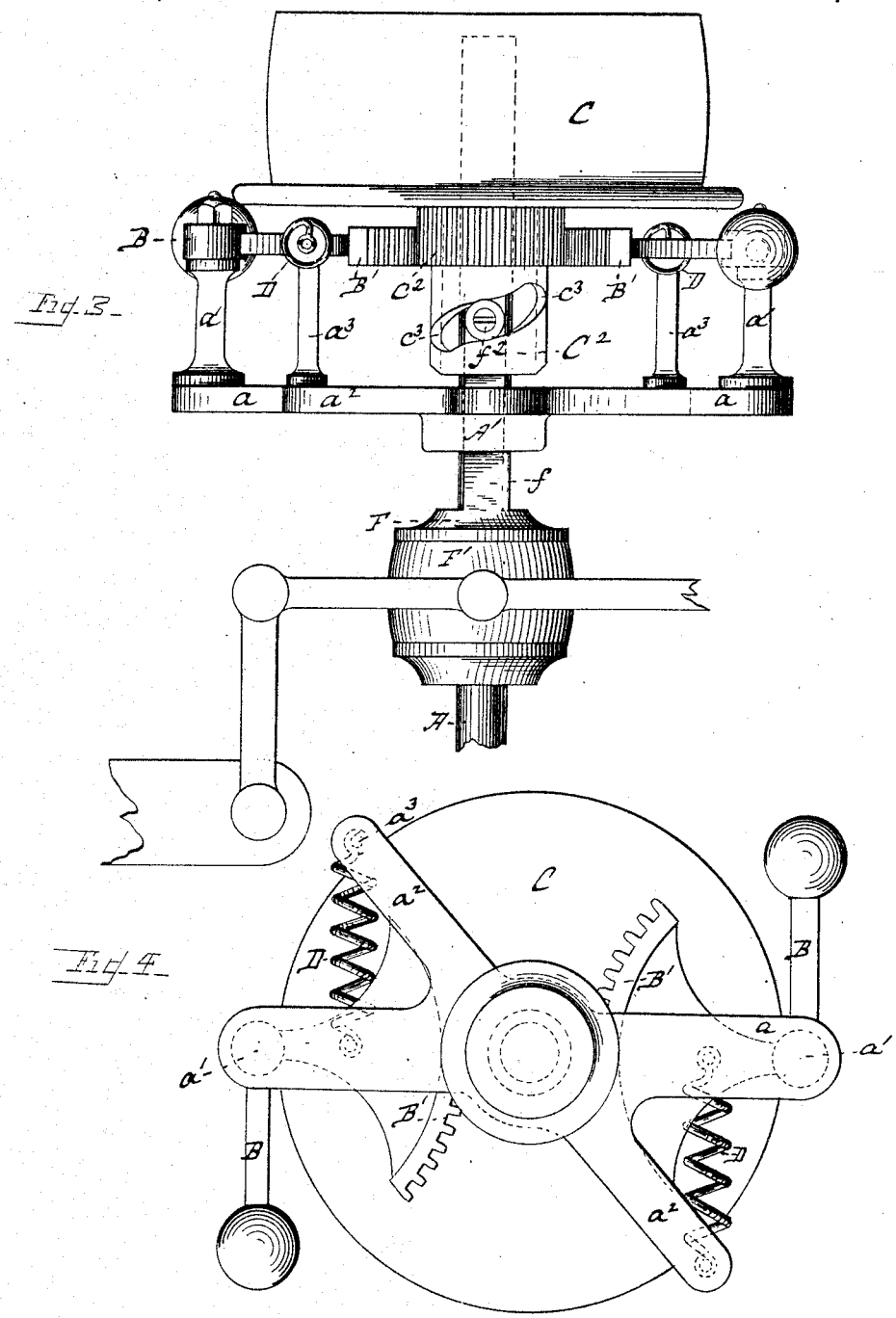

(No Model.) 3 Sheets—Sheet 3.

A. W. MESTON.
GOVERNOR FOR ELECTRIC MOTORS.

No. 353,367. Patented Nov. 30, 1886.

Witnesses
Inventor
Alexander W. Meston
By his Attorney F. W. Ritter Jr.

UNITED STATES PATENT OFFICE.

ALEXANDER W. MESTON, OF ST. LOUIS, MISSOURI.

GOVERNOR FOR ELECTRIC MOTORS.

SPECIFICATION forming part of Letters Patent No. 353,367, dated November 30, 1886.

Application filed July 8, 1886. Serial No. 207,448. (No model.)

*To all whom it may concern:*

Be it known that I, ALEXANDER W. MESTON, a subject of the Queen of Great Britain and Ireland, residing at St. Louis, in the State of Missouri, have invented certain new and useful Improvements in Governors for Electric Motors; and I hereby declare the following to be a full, clear, and exact description of the same, reference being had to the accompanying drawings, wherein like letters refer to like parts wherever they occur.

This invention relates to governors for electric motors.

The object of the invention is to automatically maintain a balance between the source of power and load, or, in other words, to maintain a uniform speed of the mechanism interposed between the power and the load, (say a driving-shaft and pulley,) whether variations arise in the power or in the load tending to increase or diminish the speed of said interposed mechanism.

Heretofore governors for regulating the speed or generative capacity of dynamo or magneto electric machines have been devised wherein said governors were operated solely by changes of speed due to variations in the load or the source of power, and others in which the governor was operated by the load, the latter permanently affecting the speed before the governor could restore a balance between load and source of power when disturbed by any change of power. It is my purpose, however, to cause the governor to respond both to changes in the power and changes in the load, so that any disproportion between the power and load (either from increase or decrease of power or increase or decrease of load) will be compensated for and the balance between power and load at once restored before a change of speed can occur in the mechanism interposed between the power and the load. This I accomplish by interposing between the power and the load (say between the motor-shaft and the driving-pulley) a yielding connection, consisting in the instance shown of a pair of governor-arms acting in opposition to coiled springs, whereby, should either the shaft or pulley change speed from any cause, the difference in speeds will act through the yielding connection to change the power of the motor, and thus restore a balance between the power and the load before a change of speed takes place in the interposed mechanism as a whole.

The simplest forms of mechanism for carrying out the principles of my invention at present known to me are illustrated in the accompanying drawings, wherein—

Figure 6:
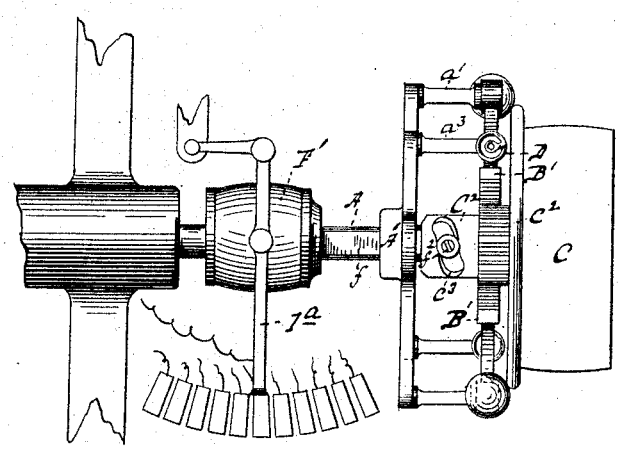

Figure 1 is a plan view of my governor and its connections. Fig. 2 is an end elevation, looking in the direction of the shaft. Figs. 3 and 4 are similar views illustrating a modified form. Fig. 5 illustrates means for connecting commutator-brushes with the governor. Fig. 6 illustrates means for connecting a shunt-lever with the governor.

Referring to Figs. 1 and 2, A is the motor-shaft, to which is rigidly secured a spider, A', the long arms $a$ of which are provided at their outer ends with journal-studs $a'$, upon which are mounted the governor-arms B, having the usual weights at their free ends, as shown.

Mounted to turn freely on the shaft A is the driving-pulley C, and projecting from the inner face of said pulley are journaled posts C', said posts being connected to the governor-arms B by means of links $c$.

In the outer ends of the short arms $a^2$ of the spider A' are secured short studs $a^3$, projecting toward the pulley C, and secured between these studs $a^3$ and the journal-posts C' are coiled springs D, the stress of which is exerted to draw posts C' toward studs $a^3$, and hence through the instrumentality of links $c$ to draw the free ends of the governor-arms B toward shaft A, as shown in dotted lines, Fig. 1.

Mounted to turn with shaft A, but to slide longitudinally thereon, is a sleeve, F, upon bosses, $f$, projecting from the inner end of which is secured a yoke, E, from opposite sides of which project curved forks $e$. These forks are set at an angle with shaft A, the outer open ends thereof being nearer to the spider A' than the inner ends, and the forks are curved transversely, the radius of the curve being equal to the distance between said forks and the journal-stud $a'$ of the spider, so that friction-rollers $b$, mounted on the governor-arms, may move from end to end of the forks without cramping or binding.

The sleeve F is provided with end flanges, $f'$ $f'$, and between these flanges is loosely fitted a collar, F′, partaking of the longitudinal movement of sleeve F upon the shaft, but not revolving with it.

From the foregoing it will be seen that any movement of the governor-arms B, either toward or from the shaft, will be communicated through forks e and yoke E to the sleeve F and collar F′, to which latter is connected a lever to control the movement of the commutator-brushes, a shunt or any known mechanical means to modify the action of the motor, and that any difference in the rate of speed between the shaft and pulley, from whatever cause, will at once cause a movement of the governor-arms B and the sleeve F, thereby instantly proportioning the power to the load.

In the modification shown in Figs. 3 and 4 the driving-pulley is provided with an elongated hub, $C^2$, upon which are formed gear-teeth $c^2$, meshing with toothed sectors B′, rigidly secured to the governor-arms B. That portion of the hub $C^2$ projecting beyond the gear-teeth $c^2$ is counterbored to encompass the bosses $f$ of sleeve F, and slot $c^3$ is formed in the hub diagonal to its axis to receive pins $f^2$, projecting outward from the bosses $f$. Any difference between the speed of the shaft and the pulley will instantly cause pins $f^2$ to traverse slots $c^3$ in one direction or the other, thus shifting the sleeve F longitudinally upon the shaft.

In Fig. 5 I have shown a means by which the governor is enabled to control the movement of the commutator-brushes. The lever I is fulcrumed at one end to a fixed point, and connected at its other end to collar F′. One end of a pitman, 2, is pivoted to the lever I, its other end being pivoted to a crank-arm, 3, fixed to a bevel-geared sector, 4. This sector is pivoted at a fixed point, 5, and gears with a bevel-wheel secured to frame 6, carrying the brushes. The movement of the collar F′ longitudinally on the shaft A will operate through the parts 1 2 3 4, &c., to shift the brushes upon the commutator.

In Fig. 6 the collar F′ is connected to a shunt-lever, I, which operates to cut out or switch in resistances battery or coils of the field-magnets in any well-known or approved manner. When the motor-shaft is in motion, the centrifugal force of the governor-arms will move said arms outward against the progressively increasing pull of the springs D, thus shifting the sleeve F and its adjuncts and progressively lessening the power of the motor in proportion to the outward movement of said arms until the power of the motor balances the pull of the springs. In this position the efficiency of the motor—that is, its power to lift a load—is *nil*, and this condition can only exist when there is no load, because the resistance of a load would be added to the pull of the springs upon the governor-arms, thus changing their position and that of sleeve F, and increasing both the power of the motor and its efficiency.

When the shaft is at rest, as there is no centrifugal force exerted, the springs D, even in their relaxed condition, will hold the governor-arms in toward the shaft, as indicated by dotted lines, Fig. 2, and in this position said arms will have moved the sleeve F and its adjuncts to a position to obtain the greatest power of the motor; hence the maximum power or efficiency of the motor is exerted in starting.

It will be seen from the foregoing that the efficiency of the motor, or the power available for lifting a load, is the whole centrifugal force minus the force exerted by the pull of the springs, and as the power of the motor is at its maximum and the pull of the springs at their minimum when the parts are in the position indicated by dotted lines in Fig. 2, the greatest efficiency of the motor is then reached, and should equal the resistance offered by the maximum load.

While the motor is running, an increase of the load would retard the pulley, and as this pulley is connected to the spider and shaft by means of links $c$ and the governor-arms said governor-arms would first feel the disproportion of the speeds and be drawn inward, thus shifting the sleeve F to increase the power of the motor (by cutting out resistances or switching in battery) before the speed of the motor-shaft could change; and if the power of the motor (or current) should decrease while the load remains the same a similar movement of the governor-arms would result. A reverse action would of course take place upon the decrease of the load or increase of the power of the motor.

The movement of the shaft and pulley with relation to each other is much magnified at the outer end of the governor-arms, and renders the motor very sensitive to slight variations in power or load.

I am aware that the use of a centrifugal governor to control the action of an electric motor is not new; but in the only instances of such use of which I have knowledge these governors operated in response to changes in the speed of the shaft on which they were mounted, and not to prevent a change in the speed of said shaft.

I am also aware that it has been proposed to interpose springs between the driving-pulleys and an armature to control the position of the brushes upon the commutator; but the method of using the change of load alone governs only for changes of load and keeps the speed uniform at a certain uniform current, and even does this only when the movement caused by the change of load is correctly proportioned and applied to cause a sufficient change of efficiency to meet the change of load. It would be practically impossible to get this movement absolutely correctly proportioned and applied, and this error would cause fluctuations in the speed. By using my centrifugal balance or governor in connection with changes of load to change the efficiency of the motor any such mechanical error of proportion between the movement and the change of efficiency is corrected.

I claim—

1. The combination, with an electric motor, of a loose power-transmitting device, an interposed mechanical resistance whose force varies with the speed of the shaft, and a switch or commutator controlled by the movement of said interposed mechanism, whereby the equilibrium or balance between power and load is maintained, notwithstanding a change of either, substantially as and for the purposes specified.

2. In combination with an electric motor, a power-transmitting device, a centrifugal governor connecting the motor with the power-transmitting device, and a commutator or switch operated through the governor, substantially as and for the purposes specified.

3. In combination with a motor-shaft, a centrifugal governor, a loose pulley connected with the governor-arms, a yielding connection between the shaft and the pulley operating in opposition to the governor-arms, and a shunt or commutator operated by the movement of the governor-arms, substantially as and for the purposes specified.

4. In combination with an electric motor, a centrifugal governor, a power-pulley loose on the shaft of the motor and connected therewith by a yielding resistance, and also connected to the governor, sliding forks journaled on the shaft and which embrace the governor-arms, and a commutator or switch controlled by the forks, substantially as and for the purposes specified.

5. The combination, with the shaft of an electric motor, of a loose power-transmitting device, a commutator or switch controlled by the power-transmitting device, and a centrifugal governor interposed between the power-transmitting device and the shaft of the electric motor, substantially as and for the purposes specified.

In testimony whereof I affix my signature in presence of two witnesses.

ALEXANDER W. MESTON.

Witnesses:
   WM. MORGAN,
   CHARLES R. MESTON.